United States Patent
Pannard et al.

(10) Patent No.: US 10,047,716 B2
(45) Date of Patent: Aug. 14, 2018

(54) METHOD FOR STARTING AND STOPPING AN INTERNAL COMBUSTION ENGINE OF AN INDUSTRIAL TRUCK

(71) Applicant: MANITOU BF, Ancenis (FR)

(72) Inventors: Mathieu Pannard, Andouille (FR); Fabien Maillault, Ancenis (FR)

(73) Assignee: MANITOU BF, Ancenis (FR)

( * ) Notice: Subject to any disclaimer, the term of this patent is extended or adjusted under 35 U.S.C. 154(b) by 30 days.

(21) Appl. No.: 15/106,198

(22) PCT Filed: Dec. 18, 2014

(86) PCT No.: PCT/FR2014/053425
§ 371 (c)(1),
(2) Date: Jun. 17, 2016

(87) PCT Pub. No.: WO2015/092297
PCT Pub. Date: Jun. 25, 2015

(65) Prior Publication Data
US 2016/0319796 A1     Nov. 3, 2016

(30) Foreign Application Priority Data
Dec. 20, 2013 (FR) .................................. 13 63187

(51) Int. Cl.
*F02N 11/00* (2006.01)
*F02N 11/08* (2006.01)
(Continued)

(52) U.S. Cl.
CPC ............ *F02N 11/0803* (2013.01); *B66F 9/20* (2013.01); *B66F 9/22* (2013.01); *F02D 41/042* (2013.01);
(Continued)

(58) Field of Classification Search
CPC .... F02N 11/0803; F02N 11/0862; F02N 7/00; F02N 7/10; F02D 41/26; F02D 41/065;
(Continued)

(56) References Cited

U.S. PATENT DOCUMENTS 2,989,741 A * 6/1961 Gordon .................... H03M 1/00
    341/108
3,063,635 A * 11/1962 Gordon ................ G01G 19/047
    177/163
(Continued)

FOREIGN PATENT DOCUMENTS

CN      201777844      3/2011
FR      2989741      10/2013
(Continued)

OTHER PUBLICATIONS

Search Report dated 2015.
(Continued)

*Primary Examiner* — Hieu T Vo
*Assistant Examiner* — Sherman Manley
(74) *Attorney, Agent, or Firm* — Ipsilon USA, LLP

(57) ABSTRACT

The invention relates to a method for starting and stopping an internal combustion engine of an industrial truck, wherein said industrial truck comprises an electric starter and an auxiliary hydraulic starter. Said method comprises steps of testing safety conditions (103), detecting instructions or requests from the operator (104), and testing auxiliary hydraulic starting conditions (105).

9 Claims, 2 Drawing Sheets

(51) Int. Cl.

| | | |
|---|---|---|
| *F02N 7/10* | (2006.01) | |
| *B66F 9/22* | (2006.01) | |
| *B66F 9/20* | (2006.01) | |
| *F02D 41/04* | (2006.01) | |
| *F02D 41/06* | (2006.01) | |
| *F02D 41/22* | (2006.01) | |
| *F02D 41/26* | (2006.01) | |
| *F02N 7/00* | (2006.01) | |
| *B60K 6/12* | (2006.01) | |

(52) U.S. Cl.
CPC ......... *F02D 41/064* (2013.01); *F02D 41/065* (2013.01); *F02D 41/22* (2013.01); *F02D 41/26* (2013.01); *F02N 7/00* (2013.01); *F02N 7/10* (2013.01); *F02N 11/0862* (2013.01); *B60K 2006/126* (2013.01); *F02D 2200/602* (2013.01); *F02N 11/0825* (2013.01)

(58) Field of Classification Search
CPC ...... F02D 41/22; F02D 2200/602; B66F 9/20; B66F 9/22; B60K 2006/126
See application file for complete search history.

(56) References Cited

U.S. PATENT DOCUMENTS

| | | | | |
|---|---|---|---|---|
| 3,108,266 A * | 10/1963 | Gordon | ................ | H03M 1/785 341/127 |
| 3,187,323 A * | 6/1965 | Flood | ..................... | H03M 1/00 324/115 |
| 3,189,891 A * | 6/1965 | Karsh | ..................... | H03M 1/00 324/99 R |
| 3,216,003 A * | 11/1965 | Harrison | ................ | H03M 1/00 341/164 |
| 3,294,958 A * | 12/1966 | Du Vall | ................ | H03M 1/00 341/157 |
| 3,377,585 A * | 4/1968 | Magnin | ................. | G08C 15/12 327/419 |
| 3,489,886 A * | 1/1970 | Trung | ..................... | G01D 1/04 341/157 |
| 3,568,179 A * | 3/1971 | Lampkin, Jr. | ........... | H03M 1/00 341/164 |
| 3,641,565 A * | 2/1972 | Ivers | ........................ | G06J 1/00 341/116 |
| 3,905,028 A * | 9/1975 | Wintz | ..................... | H03M 1/48 341/138 |
| 4,222,077 A * | 9/1980 | Yamada | ................... | H04N 1/40 341/110 |
| 4,244,004 A * | 1/1981 | Yamada | ............... | G01R 13/345 341/122 |
| 6,705,266 B2 * | 3/2004 | Tachikawa | ................ | F02N 5/00 123/179.1 |
| 8,146,559 B2 * | 4/2012 | Larson | ................ | F02D 41/0007 123/179.31 |
| 9,618,014 B2 * | 4/2017 | Morris | ...................... | F02N 7/08 |
| 9,701,312 B2 * | 7/2017 | Jensen | ................. | B60W 10/06 |
| 9,745,940 B2 * | 8/2017 | Morris | ...................... | F02N 7/08 |
| 2006/0053790 A1 * | 3/2006 | Foster | ...................... | F02N 7/00 60/629 |
| 2007/0095321 A1 * | 5/2007 | Marchand | ................ | F02N 7/10 123/179.3 |
| 2008/0201064 A1 * | 8/2008 | DiGonis | ............... | B60W 10/06 701/110 |

FOREIGN PATENT DOCUMENTS

| | | | | |
|---|---|---|---|---|
| FR | 2989741 A1 * | 10/2013 | .............. | F02N 7/00 |
| JP | 2007315338 | 12/2007 | | |

OTHER PUBLICATIONS

PCT Third Party Observation dated Mar. 2016.
Part Translation of the Description FR 2 989741 A1 dated Oct. 2013.
Manitou launches engine: auto-stop feature dated Jun. 2012.
Bosch Rexroth Launches Hydraulic Flywheel, State-Stop Technology dated Apr. 2013.

* cited by examiner

METHOD FOR STARTING AND STOPPING AN INTERNAL COMBUSTION ENGINE OF AN INDUSTRIAL TRUCK

RELATED APPLICATIONS

This application is a National Phase Application of PCT/FR2014/053425 filed on Dec. 18, 2014, which in turn claims the benefit of priority from French Patent Application No. 13 63187 filed on Dec. 20, 2013, the entirety of which are incorporated herein by reference.

BACKGROUND

Field of the Invention

The invention relates to a method of starting and stopping an internal combustion engine of an industrial truck, said industrial truck including an electric starter and an auxiliary hydraulic starter.

The invention is particularly useful for starting or stopping an internal combustion engine of a rough terrain industrial truck, of a forklift truck, of a cherry picker, or of any other truck including a device for automatically stopping and automatically restarting an internal combustion engine.

Document US 2007/0095321 A1 describes a method of assisting starting a work machine having a battery assembly and a main engine, the method comprising starting an auxiliary power unit, using the electrical power generated by the auxiliary power unit for conditioning the battery assembly, and adding the electrical power generated by the auxiliary power unit to the electrical power generated by the battery assembly for a main engine starting event.

The method of Document US 2007/0095321 A1 for assisting starting gives satisfaction, but it does not make it possible to remedy deterioration of the battery assembly preventing starting of the main engine.

A self-propelled truck for handing loads or lifting a person, the truck having at least one handling actuator and a device for automatically stopping and automatically restarting an internal combustion engine, may advantageously include a hydraulic motor acting as a starter, and a reserve of hydraulic energy. The hydraulic energy reserve drives the hydraulic motor acting as a starter in order to start the internal combustion engine. The self-propelled industrial truck advantageously includes an electronic computer for managing automatic stopping and automatic restarting of the internal combustion engine on receiving a command to move or to actuate a handling operation. The electronic computer for managing automatic stopping and automatic restarting of the internal combustion engine is preferably a programmable computer containing a program for managing automatic stopping and automatic restarting of the internal combustion engine.

That kind of industrial truck generally has a cabin with a seat for an operator and manual control means for operating multiple functions, both for movement and for handling. Foot-controlled means are also provided e.g. to operate the brakes or an accelerator, so as to modulate the transmission of motion to the wheels or to the tracks for making the industrial truck advance.

Description of Related Art

The movement functions of the industrial truck are activated when the operator acts on a manual control member, e.g. a switch button having three stable positions for causing the truck to move forwards, for causing it to stop in a neutral position, or for causing it to move backwards.

Provision may also be made to control a gearbox to change gear in order to govern the speed of advance of the truck, preferably by controlling its speed under load. A dashboard illustrates in real time the operation of the industrial truck and provides visual, voice, or audible indications to the operator in order to avoid critical positions or situations. In known manner, the internal combustion engine of the industrial truck is associated with an electric starter powered by an electric battery.

The industrial truck has an auxiliary starter, which is a hydraulic starter. This arrangement may comprise a hydraulic motor acting as a starter and connected to a hydropneumatic accumulator via an electrically controlled hydraulic valve. An electrically-driven pump may be provided for recharging the hydropneumatic accumulator, in the event of there being insufficient pressure in the hydropneumatic accumulator. A hydraulic tank is advantageously provided to enable the pump to deliver or under pressure for recharging the hydropneumatic accumulator, and for depressurizing the pump prior to performing a pressurizing step.

Because of the compactness of starter-forming hydraulic motors, the power plant of an industrial truck having both an electric starter and also a hydraulic starter occupies much the same space as a power plant having only an electric starter.

OBJECTS AND SUMMARY

A first object of the invention is to provide a method of starting and stopping an internal combustion engine for this kind of industrial truck that ensures that operation is safe and more reliable.

A second object of the invention is to provide a novel method of starting and stopping an internal combustion engine for this kind of industrial truck that avoids the risk of hardware failure and the risk of accidents to personnel.

The invention provides a method of starting and stopping an internal combustion engine of an industrial truck, said truck having art electric starter and an auxiliary hydraulic starter, the method being characterized by the fact that the method of starting the internal combustion engine includes steps of testing safety conditions, of detecting operator instructions or requests, and of testing conditions for auxiliary starting.

According to other alternative characteristics of the invention:
- The method of stopping the internal combustion engine includes a step of testing stopping conditions for the internal combustion engine.
- When the auxiliary hydraulic starter is driven by discharge from a hydropneumatic accumulator, the step of testing auxiliary starting conditions for the internal combustion engine includes testing the pressure of the hydropneumatic accumulator.
- The step of testing auxiliary starting conditions for the internal combustion engine may include testing the temperature of the internal combustion engine.
- The step of testing auxiliary starting conditions for the internal combustion engine may include testing that a time interval has elapsed since the last stop of the internal combustion engine.
- The step of testing stopping conditions for the internal combustion engine may include a test that there is no activity and no request for operation of the industrial truck.

When the auxiliary hydraulic starter is driven by discharge from a hydropneumatic accumulator, the step of testing stopping conditions for the internal combustion engine include testing the pressure in the hydraulic accumulator.

The step of testing stopping conditions for the internal combustion engine may include testing the temperature of the internal combustion engine.

The step of testing stopping conditions for the internal combustion engine may include testing an elapsed time interval since the last start of the internal combustion engine.

The step of testing stopping conditions for the internal combustion engine may include a test of the state of the electric battery powering the electric starter.

The step of detecting operator instructions or requests may include detecting action taken by the operator on a hand-operated or foot-operated control member of the industrial truck.

BRIEF DESCRIPTION OF THE DRAWINGS

The invention can be better understood from the following description given by way of non-limiting example with reference to the accompanying drawings, in which.

DETAILED DESCRIPTION

Figure 1:
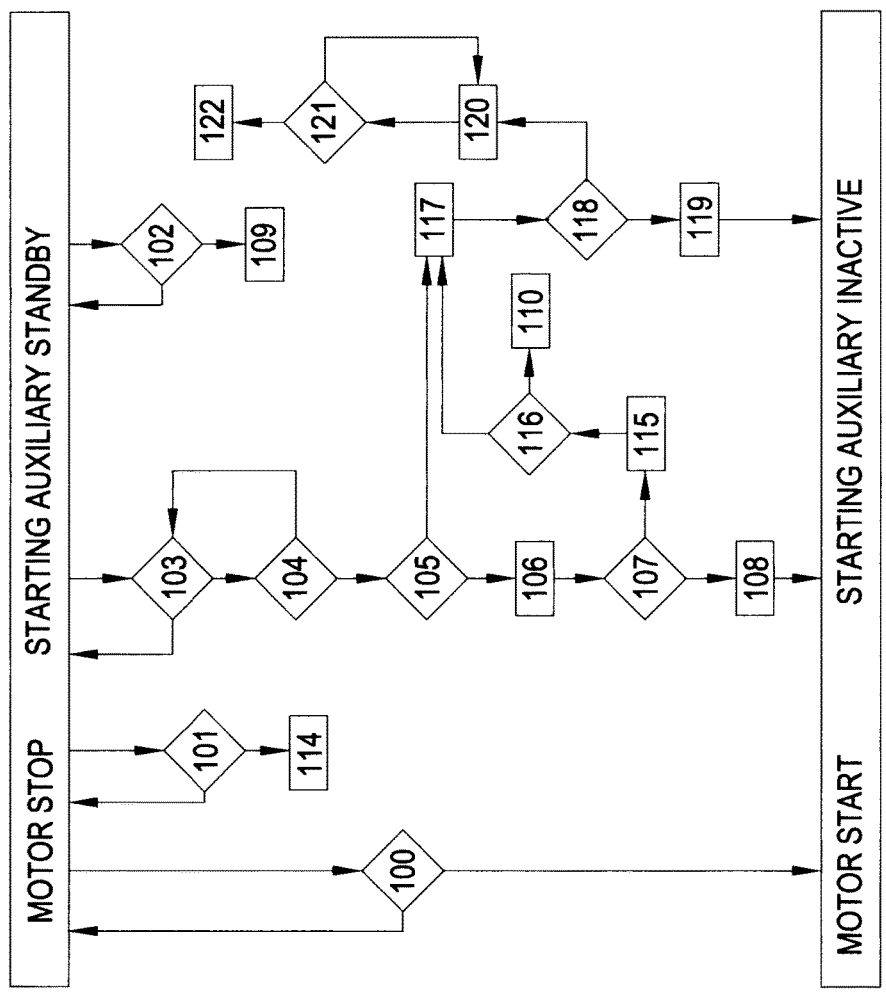
FIG. 1 is a diagrammatic flow chart showing the method of the invention for managing the starting or restarting of an internal combustion engine of an industrial truck.

In FIG. 1, a flow chart of a method of the invention for managing starting or restarting an internal combustion engine of an industrial truck comprises steps 100 to 122.

The initial situation corresponds to an internal combustion engine that is stopped, with an option for auxiliary hydraulic starting activated and after the electrical circuit has been switched on.

In this stop condition of the engine, the industrial truck to which the starting or restarting method of the invention applies has a visual indicator informing the operator that auxiliary hydraulic starting is on standby.

The indication that the auxiliary hydraulic starter system is activated on standby is advantageously provided by intermittently lighting emergency stop lights, so as to avoid consuming a large amount of electricity.

By way of example, the emergency stop lights may be activated for a short instant, once every twenty seconds, so as to minimize the consumption of electricity needed to indicate in this way that the machine is on standby.

Simultaneously with the external indication provided by the emergency stop lights once every twenty seconds, an indicator light on the dashboard of the industrial truck also serves to show that auxiliary hydraulic starting has been activated.

Starting from this stop state of the engine with auxiliary starting on standby, a first test is performed in a step 100 to verify whether the speed of the engine is less that a predetermined value, e.g. 550 revolutions per minute (rpm).

If the result of the test performed in step 100 is negative, that means that the engine is stopped and the method returns to the initial state of the engine corresponding to a stopped internal combustion engine, with an activated hydraulic starting option, after the electrical circuit has been switched on.

If the result of the test performed in step 100 is positive, that means that the engine is in fact running, and the method proceeds directly to its final state of the engine being started and the auxiliary starter system available, but inactivated.

In step 101, it is verified whether the engine has been off for some predetermined duration, e.g. about one hour.

If the test performed in step 101 is positive, then the industrial truck is put into minimum electricity consumption conditions by activating a module 114 for economizing the electric battery.

If the test performed in step 101 is negative, then the method returns to the initial state of the engine being stopped with its auxiliary starter system on standby.

In step 102, a test is performed on the level of the electric battery in order to see if the battery is low.

If the test performed in step 102 is positive, then the method moves on to a step 109 of warning the operator by a display on the dashboard and by issuing two short warning beeps at long intervals, e.g. about once every ten minutes.

If the battery level is low, the method moves on to a step 103 of testing safety conditions.

In step 103, multiple safety conditions are tested.

The safety conditions tested in step 103 comprise at least steps of testing that the auxiliary starting function is activated, testing that the engine hood is closed, testing that the cabin door of the industrial truck is closed, verifying that the engine is not running, verifying all potential safety defects on a computer, or all defects resulting in engaging an emergency stop, and verifying the fact that the engine has been stopped for more than two seconds.

If the multiple test performed on safety conditions in step 103 is negative, the method returns to the initial state of the motor stopped with the auxiliary starter system on standby.

If the multiple test on safety conditions performed in step 103 is positive, then the method moves on to a step 104 of testing an operator request.

In step 104, a test is made for operator request conditions resulting from action on a member of the industrial truck.

In non-exhaustive manner, the conditions for detecting requests or instructions from a user or an operator in step 104 may comprise any of the following verifications: verifying that an actuator of the industrial truck has been hydraulically activated by means of the dashboard, or of a control lever, or of some other control member of the industrial truck, in particular requests for operation of a lifting actuator, a lowering actuator, a telescoping actuator, a blocking or tipping actuator, an actuator for extending or retracting lateral stabilizers, or an actuator for requesting auxiliary energy for the industrial truck.

These conditions for detecting requests or instructions from a user or operator in step 104 may alternatively consist in a request for an increase in speed by pressing on an accelerator pedal, or alternatively a request to move forwards or backwards by activating the transmission for moving the industrial truck.

If the test performed in step 104 is negative, i.e. if no operator instruction or request is detected, then the method returns to step 103 of testing safety conditions.

If an operator instruction is detected in step 104, then the method moves on to a step 105 of verifying conditions for auxiliary hydraulic starting.

In step 105, the possibilities of auxiliary starting are tested, in particular the possibility of starting the internal combustion engine of the industrial truck hydraulically. This test is particularly appropriate when performing hydraulic starting by using a hydraulic accumulator that drives a hydraulic starter.

The hydraulic starting conditions tested in step 105 comprise at least the following conditions: verifying the fact that the pressure in the hydraulic accumulator is greater than a predetermined value, e.g. 180 bars; verifying the fact that the temperature of the internal combustion engine is greater than a predetermined value, e.g. 60° C.; verifying the fact that the internal combustion engine has been stopped for less than one hour; and verifying the fact that the internal combustion engine has not been running for more than three seconds.

If the result of testing auxiliary starting conditions in step 105 is negative, the method moves on to a step 117 of starting electrically by means of a conventional electrical starter motor.

If the result of testing auxiliary starting conditions in step 105 is positive, then the method moves on to an auxiliary starting step 106, and then to a step 107 for verifying auxiliary starting.

In step 107 for verifying auxiliary starting, it is tested whether auxiliary starting has been successful, and in particular it is tested whether the speed of the engine exceeds 550 rpm after a starting time that is longer than a predetermined value, e.g. 3 seconds.

If the test performed in step 107 is positive, then the method moves on to a step 108 of stopping hydraulic starting by ceasing to discharge from the hydraulic accumulator and by freewheeling the hydraulic starter.

If the result of the test performed in step 107 is negative, then the method moves on to a step 115 of observing that hydraulic starting has failed, discharge from the hydraulic accumulator is blocked, and the hydraulic starter is freewheeled.

In a step 116, it is verified whether engine speed corresponds to a zero speed and two more attempts at hydraulic starting are performed.

If hydraulic starting does not succeed after three attempts, then the method moves on to a step 110 of indicating failure on the dashboard of the truck; it then moves on to the electrical starting step 117 in order to start the industrial truck of the invention by using a conventional electric starter.

Nevertheless, in this step 110 of indicating failure on the dashboard of the truck with a stopped engine, it is preferable to switch off the indication that the auxiliary system is on standby and also, unless there is an incident, to switch off the low battery indication, if it was on.

After electrical starting step 117, the method moves on to a step 118 of verifying electrical starting.

In step 118 of verifying electrical starting, it is tested whether electrical starting has been successful, and in particular it is tested whether the engine speed exceeds 550 rpm after a starting time longer than a predetermined value, e.g. 5 seconds.

If the result of the test in step 118 is positive, then the method moves on to a step 119 of stopping electrical starting, by stopping the electrical starter.

If the test performed in step 118 gives a negative result, then the method moves on to a step 120 of observing an electrical failure of the electric starter, and the power supply to the starting coil of the electric starter is switched off.

Thereafter, in a step 121, it is verified whether the speed of the internal combustion engine is zero.

If the speed of the internal combustion engine is found to be zero in step 121, then the method moves on to a step 122 of making safe the industrial truck and stopping the starting function.

If the test in step 121 indicates on the contrary that the speed of the internal combustion engine is not zero, then the method returns to step 120 of switching off the power supply to the coil of the electric starter in order to avoid damaging the electric starter.

Thus, by means of the invention, the tests on safety conditions in step 103, the tests to detect an operator instruction in step 104, and the tests to detect auxiliary starting conditions in step 105 enable the industrial truck to be operated safely, so as to pass from a state in which the engine is stopped with the auxiliary starter system on standby and available, to a state in which the engine has started with the auxiliary starter system on standby and not activated.

Figure 2:
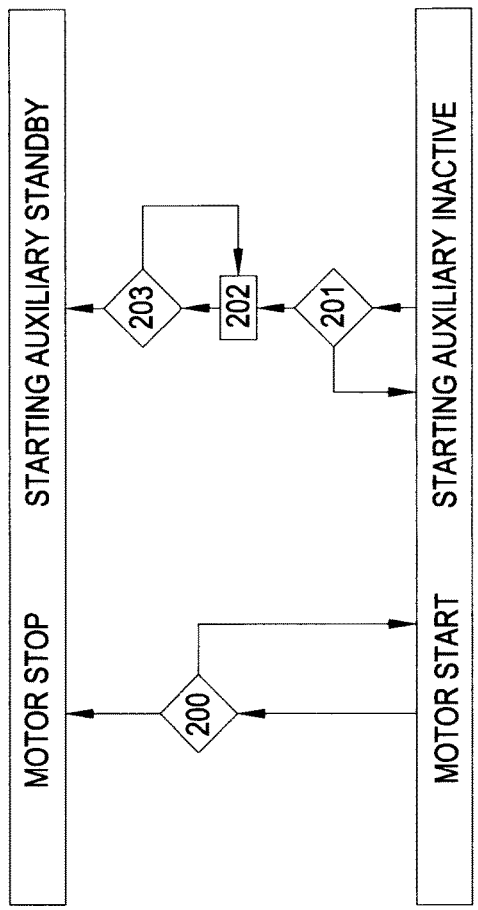
FIG. 2 is a diagrammatic flow chart of the method of the invention for stopping the internal combustion engine of an industrial truck.

FIG. 2 starts from the engine in a started state with an auxiliary starter system on standby and not activated.

In step 200, the speed of rotation of the internal combustion engine is tested in order to verify whether this speed is zero.

If the speed is zero, the method passes on directly to the state of the engine being stopped with the auxiliary starter system on standby.

If the speed of the internal combustion engine is not zero, then the method returns to the state of the engine being started and the auxiliary starter system on standby and not activated.

Starting from this state of the engine being started, a test is performed in a step 201 on the stopping conditions for the internal combustion engine.

In step 201, the stopping conditions comprise at least the following conditions: verifying that the auxiliary starting function is activated; verifying that the transmission is in neutral; verifying that a particle filter of the internal combustion engine is not in the process of being regenerated; verifying that there is no instruction from the operator; verifying that the vehicle is not moving, whether forwards or backwards, that there is no command or movement of a hydraulic actuator, and that this has been true for a predetermined duration of about thirty seconds; verifying that the auxiliary hydraulic accumulator is pressurized to a predetermined pressure, e.g. about 180 bars; verifying that the internal combustion engine has been started for longer than a predetermined duration, e.g. about two minutes; verifying that the temperature of the cooling circuit of the internal combustion engine has risen, with a temperature lying between a lower limit, e.g. 65° C., and an upper limit, e.g. 100° C.; and verifying the state of charge and the state of health of the electric battery in order to enable two consecutive electric starts to be performed.

If the test performed in step 201 gives a negative result, then the method returns to the state of the engine being started with the auxiliary starter system on standby and not activated.

If the result of the test performed in step 201 is negative, then the method passes on to a step 202 of causing the internal combustion engine to be stopped by cutting off the supply of fuel to the internal combustion engine.

After cutting off the supply of fuel to the engine in step 202, by issuing a command using the control bus of the industrial truck of the invention, a test is performed in a step 203 to verify that the speed of the internal combustion engine is zero.

If the speed tested in step 203 is not zero, then the method returns to step 202 of causing the internal combustion engine to stop by cutting off the supply of fuel to the internal combustion engine.

If the speed tested in step 203 is zero, then the method moves on to the state of the engine being stopped with the auxiliary starter system on standby.

Figure 3:
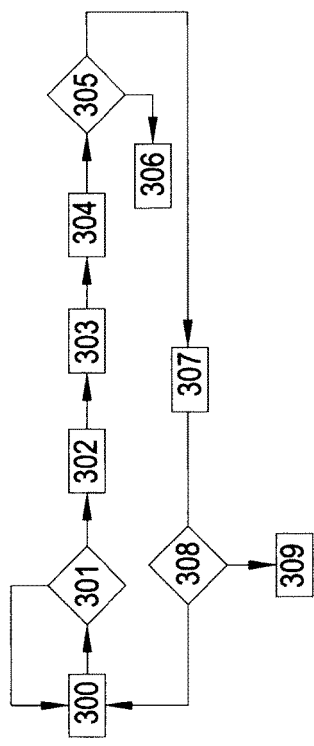
FIG. 3 is a diagrammatic flow chart of a method of the invention for managing an electrically-driven pump for recharging an accumulator for powering a hydraulic starter of an internal combustion engine of an industrial truck.

FIG. 3 shows a flow chart for software for controlling an electrically-driven pump that serves to recharge a hydraulic actuator of the industrial truck of the invention.

The initial step 300 corresponds to the recharging pump being stopped.

After step 300 corresponding to the pump being stopped, the method passes on to a step 301 of testing conditions for running the pump.

These tests of multiple conditions necessarily comprise verifying the absence of a fault on the pump, verifying that the pressure in the hydraulic accumulator is less than a predetermined value, e.g. about 180 bars, and verifying that the auxiliary hydraulic starting function is activated.

These conditions also require it to be verified whether the internal combustion engine has been stopped for more than one second and whether the internal combustion engine has been started for more than three seconds, so as to avoid contradictory mechanical movements.

After verifying these multiple conditions in step 301, the method moves on to a step 302 of depressurizing the pump by operating the pump and by putting the pump into connection with a low pressure space, e.g. a hydraulic tank.

After performing this depressurizing step 302, the method moves on to a waiting step 303 of waiting for a predetermined duration, e.g. about one second.

The method then moves on to a pressurizing step 304 by operating the pump and by connecting the pump to the hydraulic accumulator of the industrial truck of the invention.

After pressurizing in step 304, the pressure rise in the hydraulic accumulator is verified in a step 305.

The pressure rise in the hydraulic accumulator is tested in step 305 by verifying that the pressure in the hydraulic accumulator is greater than 250 bars after a predetermined pressurization duration has elapsed, e.g. about 40 seconds.

If the result of the pressurization test 305 is negative, then the method moves on to a step 306 of observing that the pump has failed and of deactivating the auxiliary starter function.

If the result of the test in step 305 is positive, then the method passes on to a step 307 of stopping the pump and recording successful pressurization.

The method then moves on to a step 308 of verifying the memory storing records of pressurization tests. In step 308, it is tested whether the last three pressurization operations were successful, and if so the method passes on to step 300 of stopping the pump.

If at least some of the last three pressurization operations are found to be negative in step 308, then the method passes on to a step 309 of indicating failure of the accumulator to conserve pressure and of deactivating the auxiliary starter function.

The invention is described with reference to particular implementations but it is not in any way limited thereto, and on the contrary covers any modification of form and any variant of implementation in the ambit of the accompanying claims.

The invention claimed is:

1. A method of starting and stopping an internal combustion engine of an industrial truck, said truck having an electric starter and an auxiliary hydraulic starter, the method of starting the internal combustion engine comprising the steps of:
    testing safety conditions, of detecting operator instructions or requests; and
    testing conditions for auxiliary hydraulic starting,
    wherein the auxiliary hydraulic starter is driven by discharge from a hydropneumatic accumulator, wherein the step of testing conditions for auxiliary hydraulic starting for the internal combustion engine includes testing the pressure of the hydropneumatic accumulator,
    wherein the step of testing conditions for auxiliary hydraulic starting for the internal combustion engine also includes testing that a time interval has elapsed since the last stop of the internal combustion engine,
    wherein the method includes starting the internal combustion engine as a function of the result of said testing steps and as a function of said detected operator instructions or request.

2. A method according to claim 1, wherein the method of stopping the internal combustion engine includes a step of testing stopping conditions for the internal combustion engine.

3. A method according to claim 1, wherein the step of detecting operator instructions or requests includes detecting action taken by the operator on a hand-operated or foot-operated control member of the industrial truck.

4. A method according to claim 1, wherein the step of testing conditions for auxiliary hydraulic starting for the internal combustion engine includes testing the temperature of the internal combustion engine.

5. A method according to claim 2, wherein the step of testing stopping conditions for the internal combustion engine includes a test that there is no activity and no request for operation of the industrial truck.

6. A method according to claim 2, wherein the auxiliary hydraulic starter is driven by discharge from a hydropneumatic accumulator, wherein the step of testing stopping conditions for the internal combustion engine includes testing the pressure in the hydropneumatic accumulator.

7. A method according to claim 6, wherein the step of testing stopping conditions for the internal combustion engine include testing the temperature of the internal combustion engine.

8. A method according to claim 6, wherein the step of testing stopping conditions for the internal combustion engine includes testing an elapsed time interval since the last start of the internal combustion engine.

9. A method according to claim 6, wherein the step of testing stopping conditions for the internal combustion engine includes a test of the state of the electric battery powering the electric starter.

* * * * *